United States Patent [19]

Sciulli

[11] Patent Number: 4,495,596
[45] Date of Patent: Jan. 22, 1985

[54] DATA ACCUMULATOR AND TRANSPONDER WITH POWER BACK-UP FOR TIME OF DAY CLOCK

[75] Inventor: Felice M. Sciulli, Pittsburgh, Pa.

[73] Assignee: Rockwell International Corporation, Pittsburgh, Pa.

[21] Appl. No.: 387,531

[22] Filed: Jun. 10, 1982

[51] Int. Cl.³ .............................................. G06F 1/00
[52] U.S. Cl. .................................................. 364/900
[58] Field of Search ... 364/200 MS File, 900 MS File; 340/870.02, 870.03

[56] References Cited

U.S. PATENT DOCUMENTS

| | | | |
|---|---|---|---|
| 3,747,068 | 7/1973 | Bruner et al. | 340/870.03 |
| 4,132,981 | 1/1979 | White | 340/870.02 |
| 4,213,119 | 7/1980 | Ward et al. | 340/870.02 |
| 4,218,737 | 8/1980 | Buscher et al. | 364/493 |
| 4,276,594 | 6/1981 | Morley | 364/200 |
| 4,301,444 | 11/1981 | Bruckert et al. | 340/870.02 |
| 4,316,246 | 2/1982 | Hartley et al. | 364/200 |
| 4,316,262 | 2/1982 | Mizuta et al. | 364/900 |
| 4,396,844 | 8/1983 | Miller et al. | 307/39 |

Primary Examiner—Raulfe B. Zache
Attorney, Agent, or Firm—Mason, Fenwick & Lawrence

[57] ABSTRACT

A system is disclosed for accumulating data from a given number of meters. The data accumulating system is normally energized by a primary source of power for accumulating data with respect to the time of day. A clock is energized by the primary power source for providing a first time of day signal. Data from each of the meters is accumulated in its own counter. Processing means responsive to the time of day signal selectively accesses the counters and accumulates the data therefrom for specified intervals of time. Means responsive to the failure of the primary power source applies a secondary source of power to the clock to provide a second time of day signal. Upon restoration of the primary power source, the second time of day signal is transferred to the clock.

26 Claims, 12 Drawing Figures

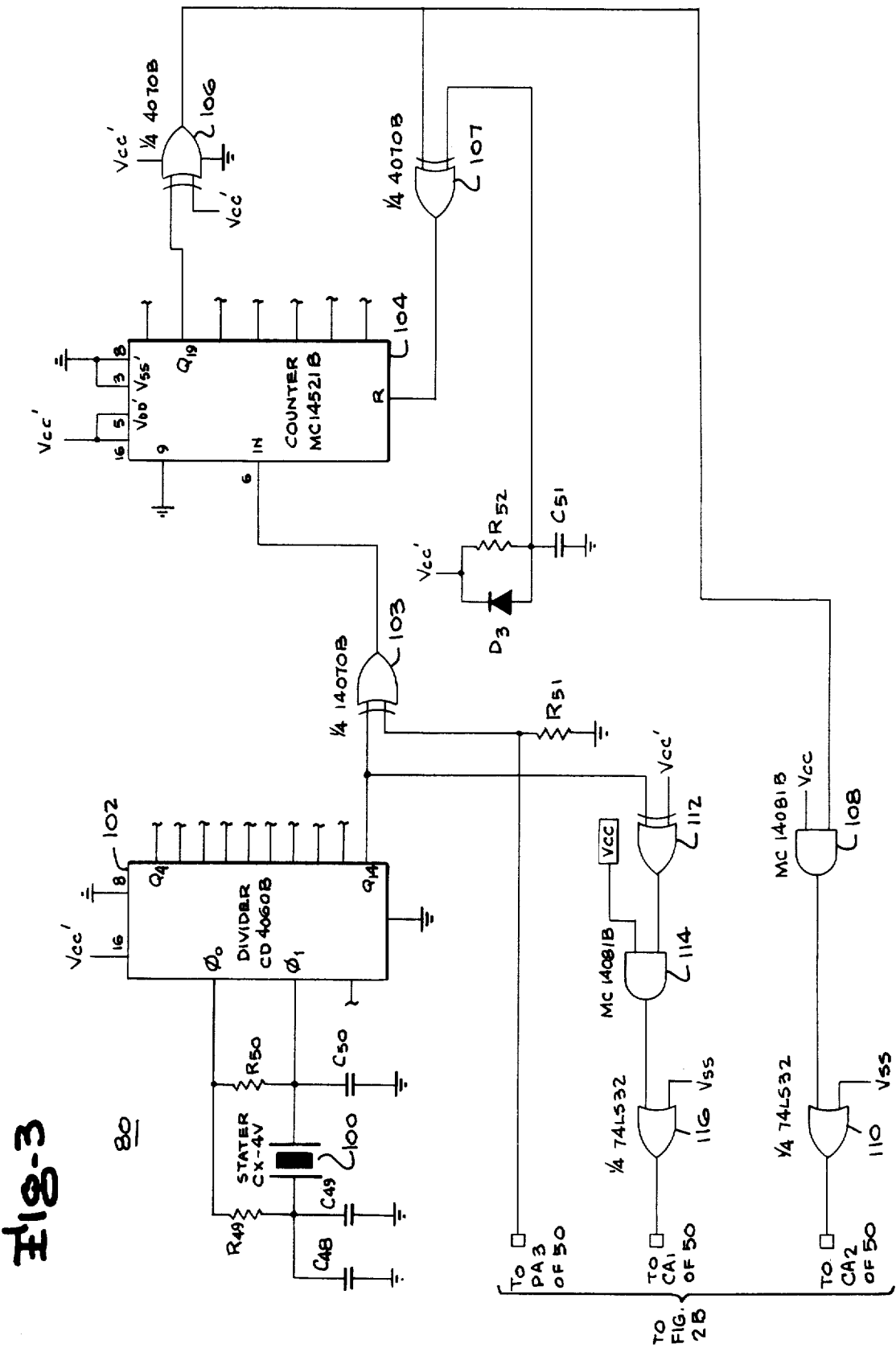

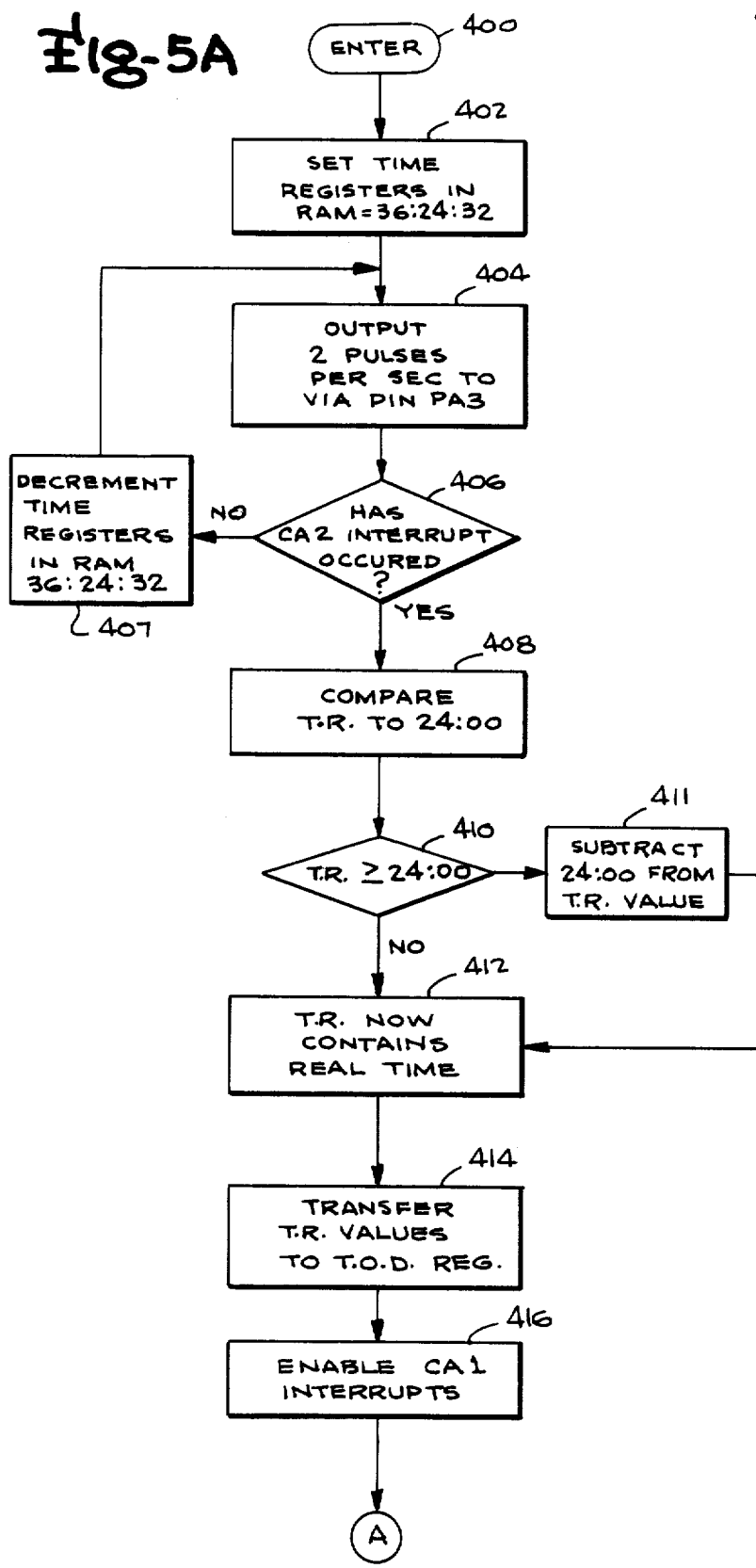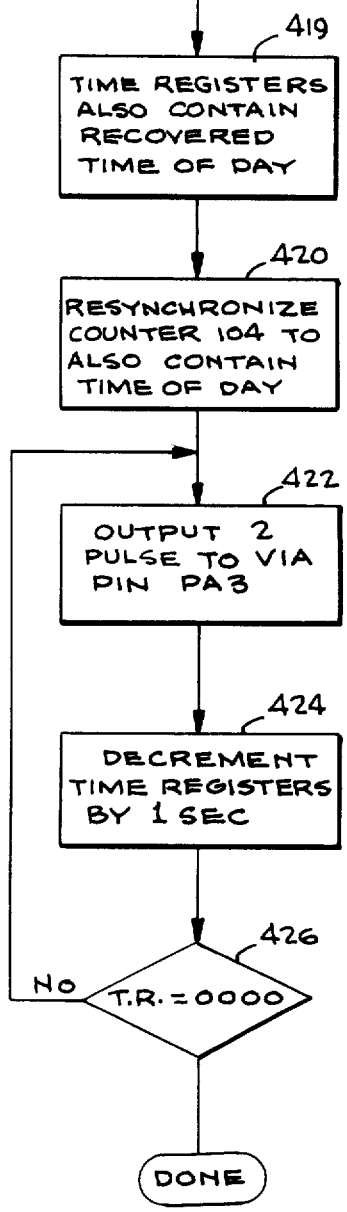

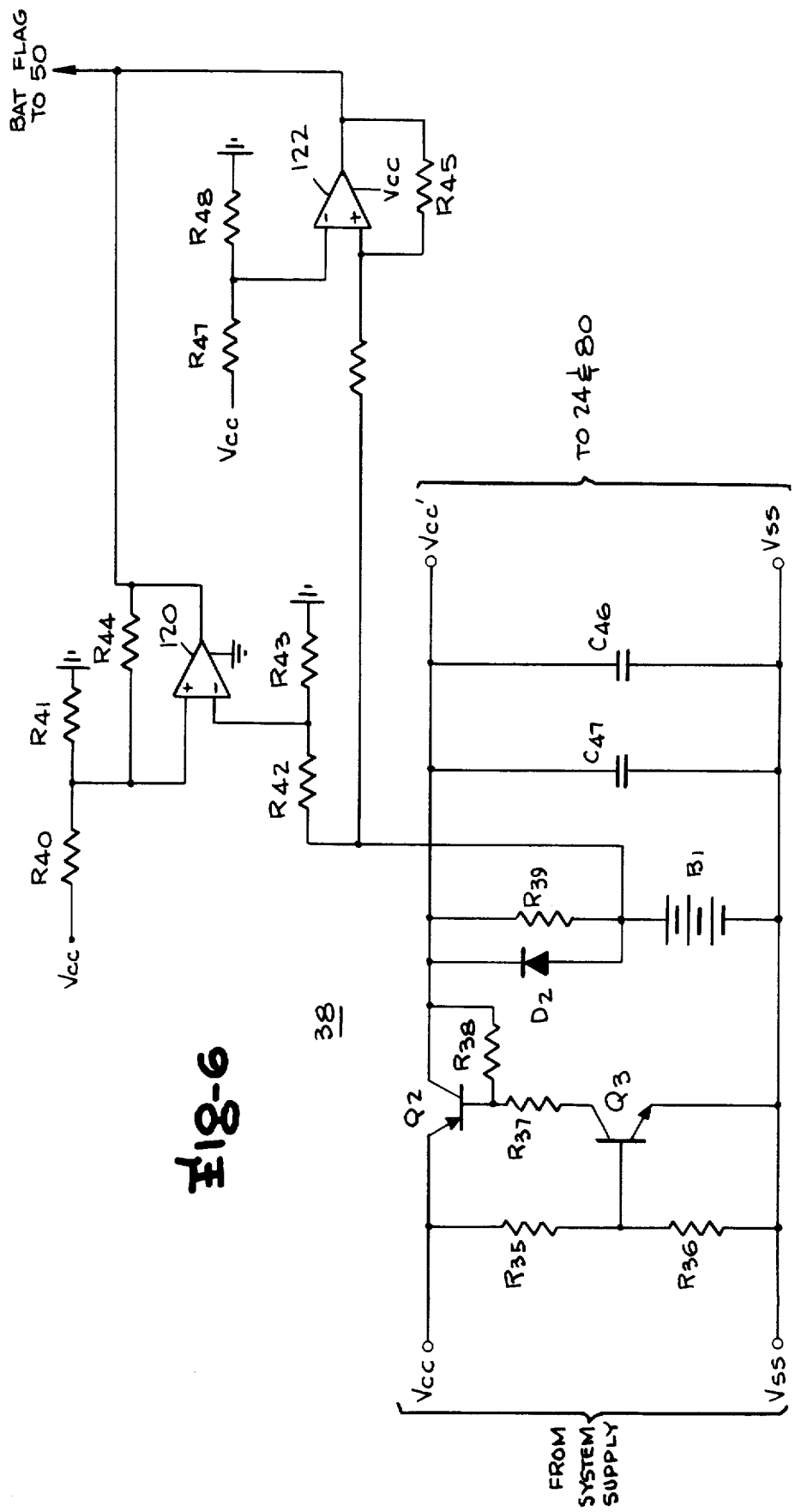

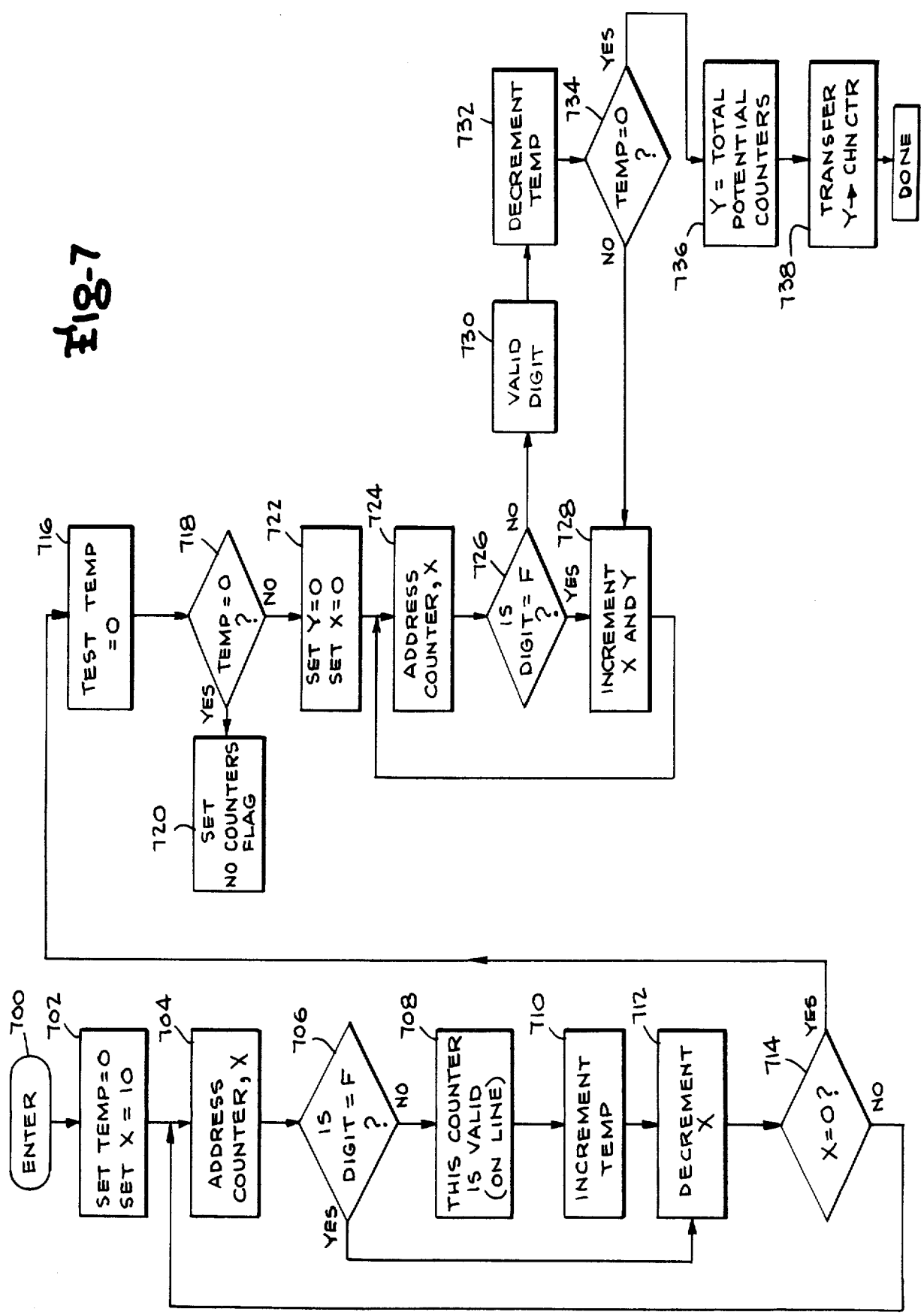

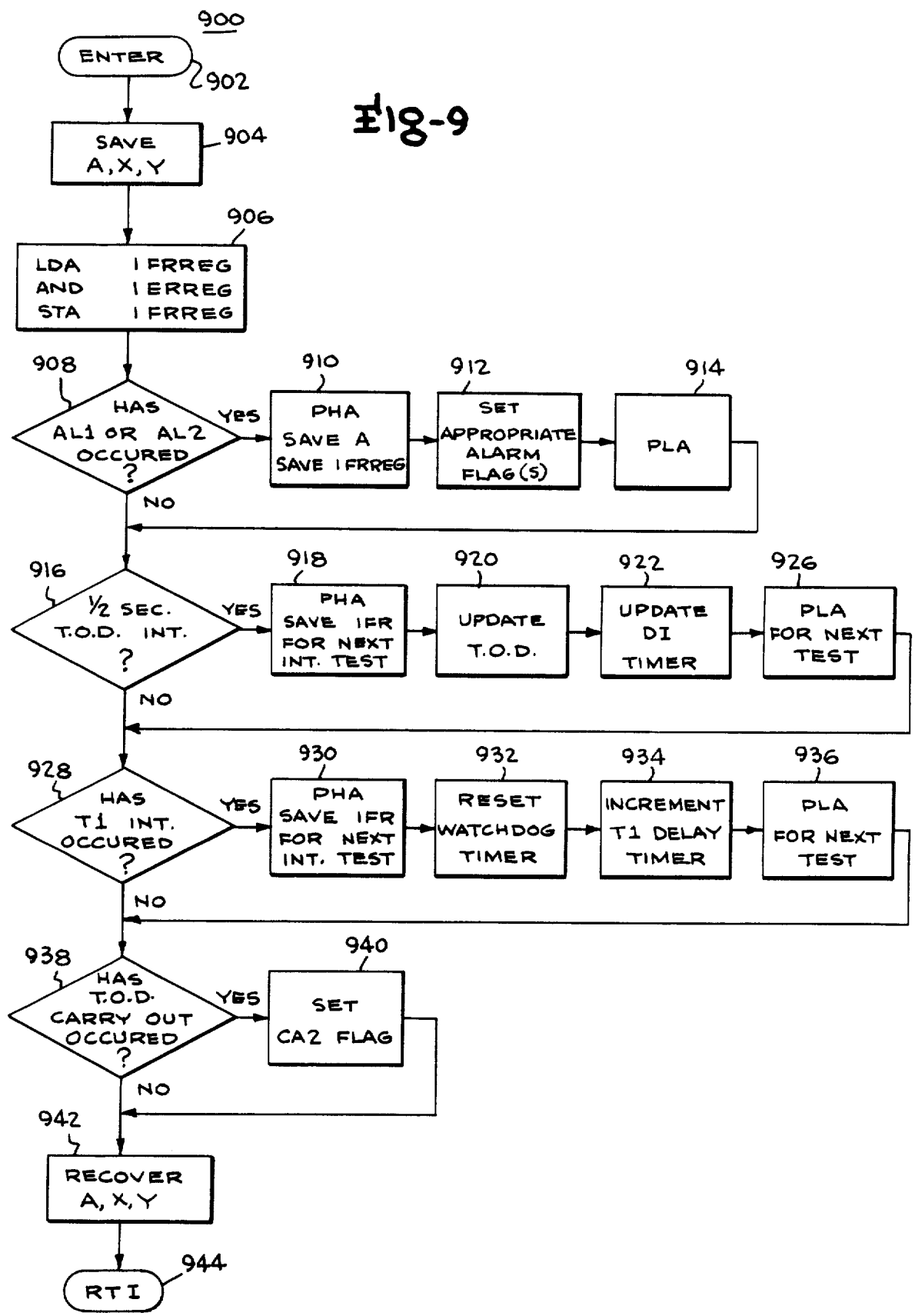

DATA ACCUMULATOR AND TRANSPONDER WITH POWER BACK-UP FOR TIME OF DAY CLOCK

BACKGROUND OF THE INVENTION

Description of the Prior Art

This invention, in its preferred form, relates to apparatus for interrogating a plurality of remote stations over available data network channels such as ordinary telephone lines, to obtain data as provided by a plurality of transponders disposed at corresponding ones of the remote stations. Typically, each of such transponders is associated with a plurality of data sources such as utility meters in the form of gas, water or electric meters.

Data accumulating systems for accessing utility meters utilizing conventional telephone lines, are well known in the art as exemplified by U.S. Pat. Nos. 3,400,378 of Smith et al.; 3,700,816 of Evans et al.; and 3,786,423 and 3,868,640 of Binnie et al. Typically in such systems, an interrogating signal is sent from the central station to a remote station, whereat the transponder is disposed to receive the interrogation signal, to access a selected utility meter, and thereafter, to transmit a return signal with data indicative of the utility consumed to the central station. The returned data indicative of the utility consumed may then be used for billing purposes. Thus, it is apparent that by utilizing the telephone lines to access data generated by utility meters, utility companies may avoid the expense of sending meter readers to the remote stations such as individual residences to read the meter and to record the utility consumed data by hand, whereby bills may be sent to the utility customers.

In the particular system described in U.S. Pat. No. 3,868,640 of Binnie et al., there is included a plurality of remote stations each including meters for registering the use of such utilities such as gas, electricity, water and/or oil. An interrogating system disposed at a central station employs a computer to transmit interrogation signals over the telephone lines to selectively access one of the remote stations. The addressed remote station responds to the interrogation signal to read the outputs of one or more of its meters. The remote station responds to the interrogation message by generating and transmiting a return signal indicative of the utility consumed of each of its meters, to the interrogating system disposed at the central station. Noting that the centrally disposed interrogating system employs a computer, such computer can be used to receive and use the utility consumed return message to compute bills for each of the customers associated with the remote stations.

The prior art has been long aware of the problems of generating sufficient electrical power at critical or peak times. One suggested solution is to encourage customer consumption of electricity at other than the critical or peak hours by employing a utility rate that charges premium prices for electricity consumed at the peak hours. The prior art has taught the use of mechanical peak demand meters, which measure the peak utility consumed to be mechanically stored and read out at a later period of time.

The prior art as exemplified by U.S. Pat. Nos. 3,747,068 of Bruner et al., 4,086,434 of Bocchi et al. and U.S. Pat. No. 4,213,119 of Ward et al. illustrate efforts to use electronic, automated interrogating systems as described above to access remote locations in a manner whereby an indication of the utility consumed at different periods of time may be sensed and transmitted back to the centrally disposed station to provide a computation of utility consumption costs based upon a variable rate schedule. A common element to each of these systems is the use of a clock at each remote station to determine the time of day and to facilitate the recording of utility consumed as a function of the time of day.

U.S. Pat. No. 3,747,068 of Bruner et al. discloses a remote meter reading system adapted to take continuous meter readings of a meter disposed at a remote station, including a transponder responsive to an interrogation signal occurring at irregular times to provide data indicative of the total accumulated consumption of utility as measured by the meter over a fixed period of time as well as an indication of the maximum utility consumed within a defined interval of that period of time. Due to the irregular interrogation of the remote meter reading system, it is desired to know the maximum or demand utility consumed for the last full time period regardless of the irregularity of interrogation. To this end, Bruner et al. discloses a demand meter supplying pulses indicative of the utility consumed to a first or demand counter that is reset each fifteen minutes by a demand clock generator. A comparator and storage circuit compares the pulse count indicative of the utility consumed in the last defined interval as stored in the counter with the previous maximum utility for a fifteen minute interval and if the current count is greater, that count is transferred to and stored in the storage circuit. At the end of a time period, e.g. one month, the demand clock generator provides a transfer signal to transfer the demand or maximum count from the comparator and storage circuit to a first of two accumulators. At the end of each fifteen minute interval, the demand clock generator applies an actuating signal to the comparator and storage circuit, whereby the comparison between the count total during the last interval and the maximum count as stored in the circuit is made. At the end of the next time period, e.g. one month, a pulse is applied to the second accumulator, whereby the maximum utility consumed within the fifteen minute interval during the second time period is stored in the other accumulator. Upon interrogation, a message including an address as derived from an address multiplexer indicative of the particular demand meter interrogated and the values as stored within each of the first and second accumulators, is transmitted via the output transponder to the interrogation unit. By evaluation of the counts as stored in the storage circuit and those in the accumulators, the maximum utility consumed for a fifteen minute interval of the last time period may be determined in accordance with a set of rules.

U.S. Pat. No. 4,086,434 of Bocchi discloses a remote condition (meter) reporting system employing a microprocessor and a calendar clock circuit operative to interrogate a plurality of meters including a gas, water or electric meter as connected to a latch. The clock circuit is generally used to provide timing signals whereby the microprocessor can initiate telephone calls to a central location and significantly, to accumulate pulses from the meters over a given period of time. Further, a battery as charged from a standard 60 cycle house current line is used to provide power to each of the components including the microprocessor, whereby the system continues to be energized in the event of an electrical power outage. The calendar clock circuit provides timing signals indicative of the time of day and the day of month for reporting purposes. However, the clock is connected to a 60 cycle house current as a timing reference, whereby if the primary, power supply, i.e., the 60 cycle house current, fails, the clock circuit likewise will stop keeping time.

U.S. Pat. No. 4,213,119 of Ward et al. discloses a remote meter reading system, wherein a mobile remote unit is adapted to interrogate by the use of a laser beam a utility meter coupled to a monitor unit and to a transponder. In operation, an interrogator beam is transmitted from the remote unit to the transponder and the monitor unit, which in turn interrogates the utility meter to determine the quantity of measured utility. The monitor unit in turn transmits a data radiation pulse train that is detected by a receiver unit, the detected data to be stored in a data storage unit. The data storage unit includes a multiple memory monitor unit, wherein there is included a plurality of storage and readout units, each connected by an optical monitor to a utility meter. Upon receipt of an interrogation pulse, each of the storage and readout units is sequentially interrogated and a train of pulses is applied to a laser data transmitter, which in turn generates a plurality of data laser pulses. A "time of day bracketing circuitry" is disclosed as including a plurality of counters, each dedicated to count pulses corresponding to consumption of a unit of measured utility for a particular time period. A clock signal is applied to an "N countdown counter" whose output is in turn applied to a "time bracket selector" which provides three outputs to selectively enable one of the corresponding gates, whereby the count as derived from the meter scanner may be selectively applied to one of the counters. In a particular embodiment, a first counter stores utility consumption occurring daily between 1200 and 2000 hours of the day, a second counter stores utility consumption occurring between 2000 and 0400 hours and a third counter stores consumption between 0400 and 1200 hours. In this manner, a variable price rate is established for the consumption of utility in each of these three time periods during a 24 hour day. Further, a digital circuit for obtaining the maximum count or utility consumed during any test interval within a billing period is disclosed; for example, this digital circuit provides the maximum count during any fifteen minute interval within a 24 hour day. To this end, a clock is applied to a divide by N circuit to provide an output pulse for each fifteen minute interval. The meter output pulses are applied to a current buffer counter for each fifteen interval, and at the end of an interval are compared by a comparator to the number of meter pulses as previously stored in a peak storage register. If the pulse count of the peak storage register is greater than that stored in the current buffer counter, the comparator enables a transfer of the pulses stored in the current buffer counter to the peak storage register.

The above described remote meter reading systems employ a time of day clock to enable the selective storing of pulses indicative of utility consumed into discrete counters each dedicated to a particular time period. However, none of these patents makes provision for failure of the primary power source, e.g., the AC power lines. In the case of such failure, no provision is made to provide an ongoing indication of the present, accurate time of day. As a result, if there is a power failure, there is no assurance of an accurate measurement of the utility consumed during a particular period. For example, if upon return of power, the remote meter reading system is again energized, it is necessary to again reset the time of day clock of that system and to disregard the stored indications of utility consumed in that there is no assurance that there was an accurate indication of time of day whereby the measurements of utility could be properly attributed to a particular time period.

The prior art and in particular U.S. Pat. No. 3,820,073 of Vercellotti et al. has dealt with the problems associated with meter reading systems due to power failure. Typical of the prior art, Vercellotti et al. describe a remote meter reading system wherein upon restoration of power after failure, a binary non-volatile counter in which the accumulation of a utility is stored, is reset in a manner to accurately reflect its condition at the time of power failure. In another approach, U.S. Pat. No. 3,786,423 of Martell describes a remote meter reading system having a plurality of counters each associated with a meter for receiving its output pulses to be stored therein, and an auxiliary power supply in the form of a battery associated with the counters or accumulators to prevent count loss upon primary power failure. However, the aforedescribed prior art does not deal with the problem of restoring the time of day clock to the present time after restoration of power. Thus, if there is a power failure or interruption, the measurements accumulated in a remote meter reader system may not accurately reflect the power consumed during a particular time interval and the bills based upon a variable rate structure dependent upon time would be in error.

SUMMARY OF THE INVENTION

It is therefore an object of this invention to provide a new and improved clock for a data accumulating system capable of maintaining an accurate indication of time even in the event of primary power failure.

It is a still further object of this invention to provide a new and improved clock for a data accumulating system that is energized by an auxiliary battery source upon failure of its primary source.

It is a still further object of this invention to provide a new and improved clock for a data accumulating system including a volatile memory for receiving the current, correct time of day indication and a clock that is also energized during primary power failure by an auxiliary power source, whereby upon reestablishment of the primary energy source, a correct time of day may be transferred from the auxiliary clock to the volatile memory.

It is a still further object of this invention to provide a new and improved computer implemented data accumulating system wherein the computer has a clock energized in the event of primary source failure by an auxiliary power source, whereby the correct time as continuously provided by the clock is transferred to the computer, and in particular, to its memory upon the restoration of the primary power source.

It is a still further object of this invention to provide a computer implemented data accumulating system, which includes a counter for receiving and accumulating data pulses, a clock source for providing time of day information relative to the accumulation of the data pulses, a memory coupled to the clock source for storing a manifestation of the correct time, the clock source powered in the event of primary power failure by an auxiliary power source, and logic circuitry activated upon the restoration of the primary power source to transfer a correct time of day indication from the clock source to the memory.

A still further object of this invention is to provide a data accumulating system implemented by a computer, a selected number of data sources, a fixed number of counters, wherein the computer is able to access and multiplex those data sources actually coupled to the system whereby their (its) data are stored in corresponding of a like number of the counters.

In accordance with these and other objects of the invention, there is disclosed a data accumulating system comprising a clock energized by a primary power source, and the clock energized upon the failure of the primary power source by a secondary or auxiliary power supply for providing a correct indication of time during the failure of the primary power source. Thus, upon restoration of the primary power source, the clock provides a correct indication of time.

In a specific embodiment of this invention, a volatile, primary memory in the illustrative form of a random access memory (RAM) receives the correct indication of time from the clock. Upon the failure of the primary power source, the volatile memory as energized by the primary power source is deenergized and the correct indication of time is lost. A secondary memory is energized by the secondary power supply to receive and store the output of the clock during the primary power source failure. Upon restoration of the primary power source, the indication of time as stored in the secondary memory is transferred into the reenergized, volatile memory.

In a particular implementation of this invention, the clock is energized by the secondary power source to provide a clock pulse received and accumulated by the aforementioned secondary memory in the form of a counter. Upon restoration of the primary power source, a high frequency source applies a fixed number of pulses to the secondary memory, causing an indication of its stored count to be transferred to the volatile, primary memory. In a specific arrangement, the high frequency clock continues to be counted in the secondary memory until it overflows at which time the correct time has been transferred. In particular, upon restoration of the primary power, a maximum count is established within the volatile memory associated with the primary clock and is decremented upon each pulse of the noted high frequency count until the overflow condition occurs. The occurrence of the overflow condition indicates that the volatile memory has been reset with the correct time as transferred from the secondary memory.

In a further aspect of this invention, the above described timing system is incorporated into a data accumulating system wherein at least one data source in the illustrative form of a utility meter is associated with a memory in the form of a counter for receiving and accumulating pulses derived from the data source to provide an indication of the metered event, e.g. the amount of utility in the form of water, electricity or gas consumed. A timing system permits the metered quantity to be accumulated over intervals of time corresponding to discrete periods of the day, whereby a variable pricing structure may be established such that the measured quantity consumed at peak demand periods of the day may be charged at higher rates than the utility consumed at other periods of the day.

In a still further aspect of this invention, a data accumulating system is taught that employs a processor and a fixed number of counters or memories adapted to be coupled to a selected, variable numbers of data sources. Each data source is associated with one of the counters so that its output pulses is received and accumulated therein. In accordance with the teachings of this invention, the processor is programmed to automatically determine the number of data sources coupled to the system, whereby their outputs are accessed and applied to a like number of counters that are thereby dedicated to the selected number of data sources.

BRIEF DESCRIPTION OF THE DRAWINGS

A detailed description of a preferred embodiment of this invention is hereafter made with specific reference being made to the drawings in which:

FIG. 3 is a detailed circuit diagrams of the time of day circuit;

FIGS. 5A and 5B are flow diagrams of a routine executed by the microprocessor system of FIGS. 1, 2A and 2B, to reset the time of day circuit shown in FIGS. 1 and 3;

FIG. 6 is a detailed diagram of a battery backup supply circuit for sensing the failure of the primary power source and for applying an auxiliary memories or power source to the time of day circuit shown in FIG. 3 and to the memories counters shown in FIG. 1;

FIG. 7 is a flow diagram of a routine executed by the microprocessor system of FIGS. 1, 2A and 2B, for determining the number of data sources actually coupled to the meter reading system;

FIG. 9 is a high level flow diagram of the interrupt request routine that is used by the microprocessor to handle systematically the input signals as are applied to the interrupt inputs thereof.

DESCRIPTION OF THE PREFERRED EMBODIMENT

Figure 1:
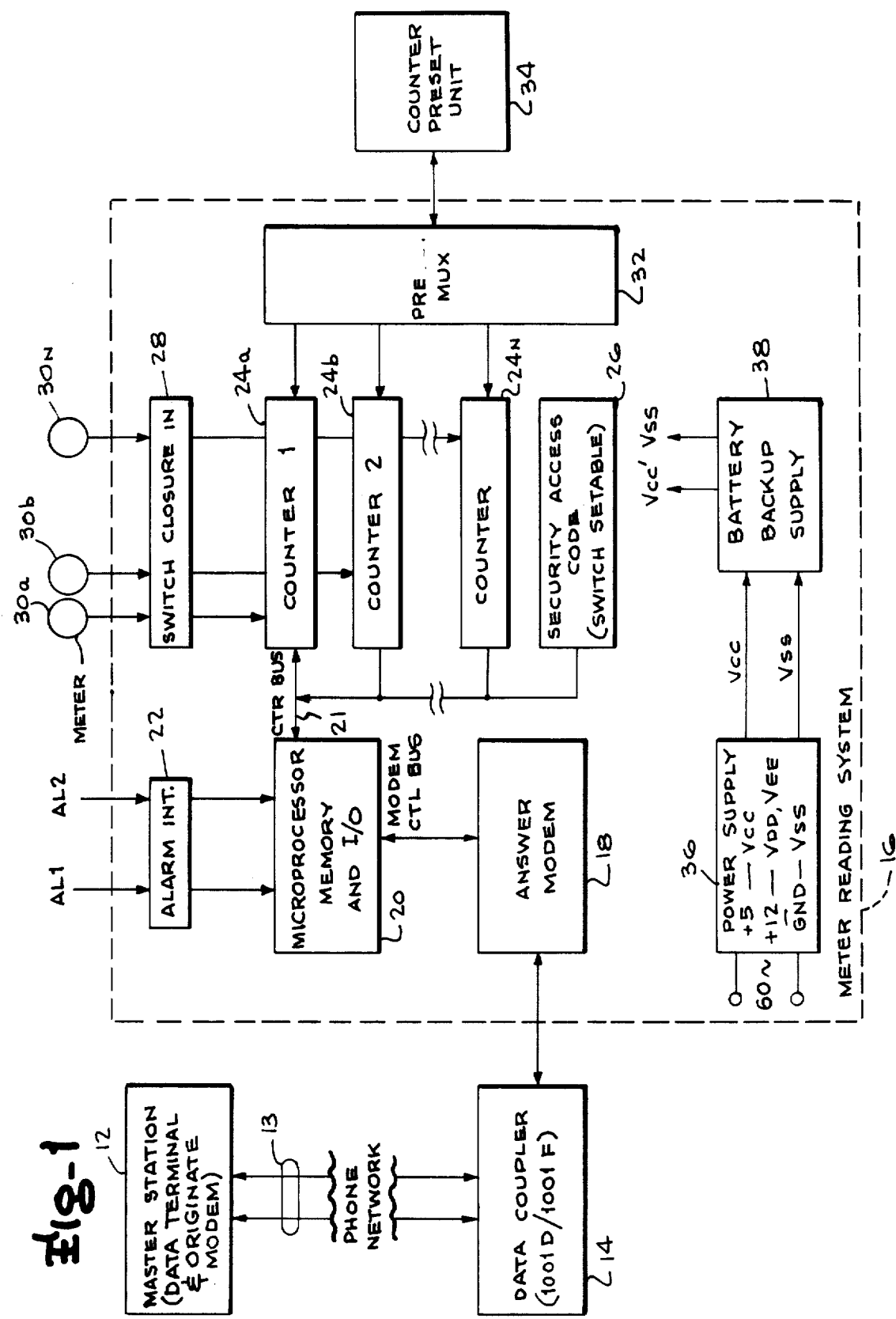
FIG. 1 is a functional block diagram of a data accumulating system in accordance with the teachings of this invention for receiving interrogation codes from a centrally disposed system for accessing accumulated data in a selected one or ones of a variable, selected number of data sources.

Referring now to the drawings and in particular to FIG. 1, there is shown a data accumulating system 16 as may be disposed at a remote station and coupled to a master station (data terminal) 12 via telephone lines or other conventional communication link 13, such as power lines or radio. In particular, the communication link 13 is connected to a data coupler 14 and an answer modem 18; the answer modem 18 is a frequency shift keying (FSK) modulator/demodulator as are well known in the art, e.g. a Bell 103 modem. The data accumulating system 16 is designed to read from one to a given number "n", e.g. 10, of data sources in the illustrative form of meters 30a to 30n. The meters 30 may be gas, water, electric or any other device that outputs pulses that may be counted. It is further contemplated that the data sources may take the form of any analog data source and that this data accumulating system 16 may include suitable analog to digital converters such as voltage control oscillators that convert such analog inputs to digital outputs in the form of trains of pulses whose number is proportional to the data being measured. Each meter 30 is associated with a respective one of a plurality of counters 24a to 24n that accumulates pulses and the system has an ability to receive a variable number of such meters 30n, less than or equal to "n". The data accumulating system 16 permits a centrally disposed operator to access via the master station 12 the data accumulating system 16 and to obtain the accumulated outputs of each of its counters 24a to 24n. An initializing or counter preset unit 34 is used with each data accumulating system 16 to preset selectivity via a preset MUX 32 the counters 24a to 24n, with an initial value or count. The preset MUX 32 permits the counter preset unit 34 to selectively monitor the contents of a particular counter 30 and if required, apply an initial value of count to a particular counter, e.g., the preset MUX 32 selectively applies a count, for example, to the first counter 24a.

The data accumulating system 16 has the capability of detecting a given number of alarm signals AL1 and AL2 applied via an interface 22 to a microprocessor system 20. The data accumulating system 16 is provided with a power supply 36 coupled to an ordinary 120 V.A.C., 60 Hz line. In addition, a battery backup supply circuit 38 is connected to each of the counters 24a to 24n making them in effect non-volatile upon failure of the primary power supply and also to energize a time of day (TOD) clock circuit 80 (included generally within the microprocessor system 20 as shown in FIG. 1) that continues to provide the correct time of day even if the primary power source should fail, as shown in detail by FIG. 3. In addition, each data accumulating system 16 has a storage element 26, which is a security access code that permits access to the system 16 only by an interrogation message from the master station which contains the corresponding code. The data accumulating system 16 has the capability of accumulating pulses from any number of meters 30 up to "n" for a programmable period of time, whereby data, i.e. a number of pulses per given time period as indicative of the metered utility, may be determined and transmitted back to the master station 12. As will be explained, the operator at the master station 12 may transmit a call to a selected data accumulating system 16 to set or reset the time period. The TOD clock circuit 80 generates and stores a correct time of day indication that will not be lost upon failure of the primary power source. After restoration of the primary power source, an indication of the correct time is transferred from the TOD clock circuit of FIG. 3 to be stored within a volatile, primary memory in the form of a RAM 70 included generally within the microprocessor system 20 of FIG. 1 and as shown in detail by FIG. 2B. The TOD indication as stored in the RAM 70 is used in the calculations of data rate, e.g. the rate of water consumption, as will be explained in greater detail later. It is further contemplated that the TOD indication may be used to identify the time of occurance of a particular event, e.g. to determine the use of electricity at a particular time of day whereby electricity used during peak demand times may be billed at a higher rate. In addition, the time of day indication may be used to provide a history of data occurances, typically known as "histograms", whereby a utility used may be recorded in selected intervals, over an extended period of time. For example, water usage for each hour of the last day may be accumulated to provide a statistical record thereof. In addition, the microprocessor system 20 as shown in detail by FIGS. 2A and 2B, is programmed (as will be explained in detail later) to determine the number of meters 30 that are presently coupled to the data accumulating system 16 and to perform calculations and data retrieving procedures on only those meters that are actually coupled.

Figure 2A:
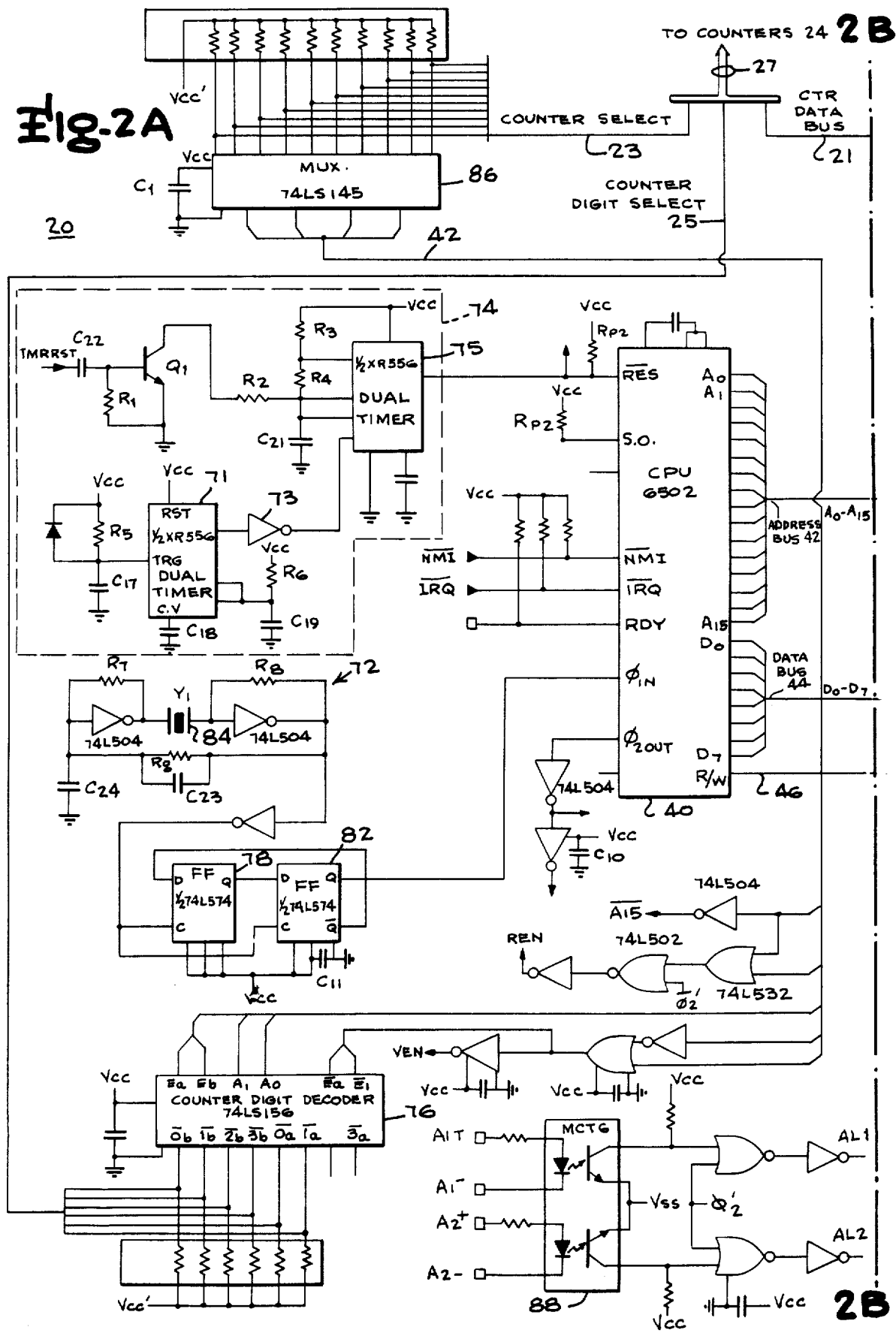
FIGS. 2A and 2B are detailed circuit diagrams of the microprocessor system, shown more generally in FIG. 1.
Figure 2B:
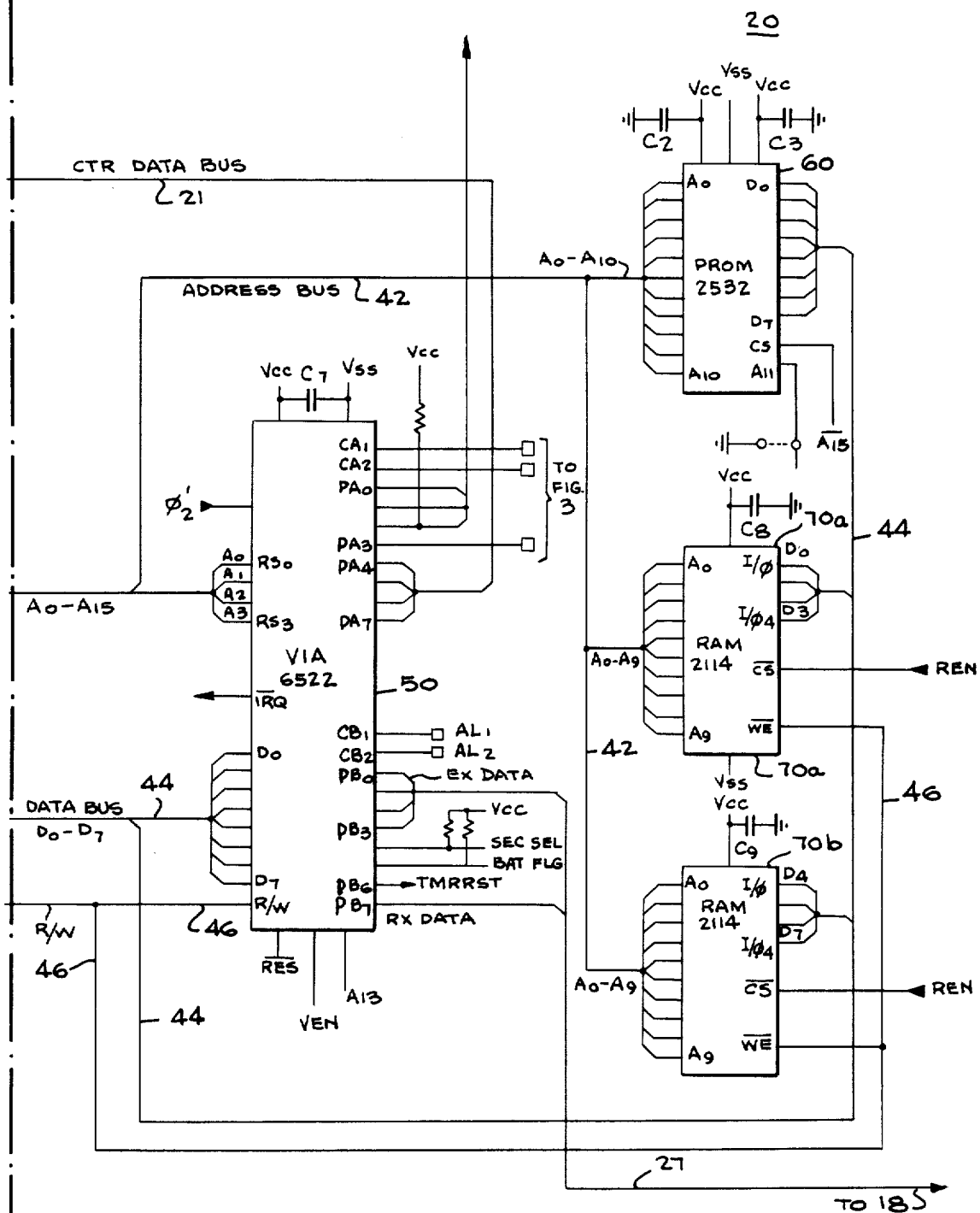

The microprocessor system 20 as generally shown in FIG. 1 is shown in detailed circuit form in FIGS. 2A and 2B. The microprocessor system 20 includes a processor 40 illustratively taking the form of a model 6502 CPU manufactured by the assignee of this invention, and an interface logic unit known as a VIA 50 illustratively taking the form of a model 6522 as manufactured by the assignee of this invention. A non-maskable interrupt (NMI) is derived from the answer modem 18 as shown in FIG. 1 upon the reception of an interrogation call from the master station 12 to initiate the processing of the interrogation signal transmitted by the master station 12, whereby only those counters 24 coupled to meters are accessed to determine the pulse counts accumulated from the coupled meters 30 and to retransmit a message via the answer modem 18 and the data coupler 14 to the master station 12. A computer clock 72 comprises a crystal oscillator 84 whose output is applied via flip-flops 78 and 82, which divide the 4 MHZ clock signal down to 1 MHZ, to be applied to an input Qin of the processor 40. An address bus 42 connects the processor outputs A0 to A15 to the VIA 50 and to each of a programmable read-only-memory (PROM) 60 and of an addressable memory taking the form of the RAM's 70a and 70b. A data bus 44 is connected to the processor outputs D0 to D7 of the PROM 60 and to the outputs D0 to D3 of the RAM 70a, to the outputs D4 to D7 of the RAM 70b to the inputs D0 to D7 of the processor 40, and to the D0 to D7 outputs of the VIA 50. The address bus 42 is also applied to the counters 24 via a counter select decoder in the form of a MUX 86 illustratively taking the form of a model 74LS145 as manufactured by SIGNETICS. The MUX 86 responds to the address signals derived from the processor 40, to select one of the counters 24. The particular digit of the selected counter is selected by address signals applied via a counter digit decoder 76 taking the form of a model 74LS156 of SIGNETICS which in turn applies its signals via a bus 25 to the counters 24. As generally shown in FIG. 2A, each of the counter select bus 23 and the counter digit select bus 25 is connected to the counters 24, whereas a counter data bus 21 applies the count of an addressed counter 24 to the inputs PA4 to PA7 of the VIA 50. As shown in FIG. 2A, outputs of selected alarm circuits are applied via an interface circuit 88 comprised of optical isolators, whose outputs are in turn applied as shown in FIG. 2B to inputs CB1 and CB2 of the VIA 50. As will be explained in detail with respect to FIG. 3, the time of day circuit 80 is connected to the microprocessor 40 by way of the inputs CA1, CA2 and PA3 of the VIA 50, as illustrated in FIG. 2B. After accessing of data from the counters 24, a suitably formatted data signal is transmitted from the output PB0 as shown in FIG. 2B by bus 27 to the answer modem 18, which then modulates the data signal and transmits it to the master station 12.

Referring to FIG. 2A, there is shown a power-on reset and watchdog timing circuit 74, whose output is applied to the $\overline{RES}$ input of the CPU 40 forcing this input low, whereby the CPU 40 is reset and its initialization routine is addressed. As will be explained later, the initialization routine calls the program as shown in FIGS. 5A and 5B to transfer after power restoration a correct time of day indication to the RAM 70. In particular, the circuit 74 includes a first dual timer 71 that is connected to resistor R5 and capacitor C17 to establish a period after the initial application or restoration of the primary voltage Vcc during which the primary voltage stabilizes, before the CPU 40 begins to execute its programs and in particular, calls its initialization program. Upon the application of the primary voltage Vcc, the capacitor C17 is charged through resistor R5, until the charging voltage equals the triggering voltage of the timer 71, at which time the timer output goes high, whereby the output of the circuit 74 as derived from a second timer 75 goes low to reset the CPU 40. The circuit 74 further includes a watchdog timing circuit including the second timer 75, which is connected as an oscillator to provide an output every 2 seconds, unless otherwise reset or defeated. In particular, the CPU 40 will generate from its via 50 a reset signal TMRRST if the CPU 40 is operating correctly. It is contemplated that the primary voltage Vcc may go low, thus disrupting the normal execution of the programs by the CPU 40; if this should happen, the reset signal TMRRST will not be generated. In normal operation of the CPU 40, the reset signal TMRRST will be applied every 50 ms to the base of transistor Q1 rendering it conductive, whereby the capacitor C21 will be discharged to ground. Thus in the absence of the reset signal TMRRST, capacitor C21 will charge to trigger the timer 75 thus driving the $\overline{RES}$input low to reset the operation of the CPU 40.

The time of day circuit 80 is shown in the detailed circuit diagram of FIG. 3 as including a clock comprised of circuit elements C48, C49, C50, R49 and R50, and a crystal oscillator 100 whose output is applied to the ∅1 input of a divider 102, illustratively taking the form of a model CD4060D as manufactured by RCA. An output is taken from the counter 102 and applied via a NOR gate 103 to the input of a secondary memory in the form of a counter 104 illustratively taking the form of a model MC14521B as manufactured by MOTOROLA. As will become apparent by the further description of the operation of the time of day circuit 80 and in particular of the program for the operation thereof as will be explained with respect to FIGS. 5A and 5B, upon primary power failure, an auxiliary battery B1 (as shown is FIG. 7) applies a voltage Vcc' to the time of day clock circuit 80. FIG. 3 clearly shows that the auxiliary voltage Vcc' is applied to the elements of the time of day circuit 80, whereas the microprocessor system as shown in FIGS. 2A and 2B is energized by the primary power source Vcc. As shown in FIG. 1, the primary power source in the typical form of a 60 Hz signal energizes the power supply 36 which provides a voltage Vcc to the elements of the microprocessor system 20, as well as to the secondary power source in the form of the battery backup supply 38. Upon the failure of the primary power source, the backup supply 38 continues to apply the voltage Vcc' to energize the time of day circuit 80, whereby a clock signal continues to be applied to the counter 104 and accumulated therein until the primary power source is restored. As will be explained with respect to FIGS. 5A and 5B, upon the restoration of the primary power source, the count stored within the secondary memory, i.e. the counter 104, is transferred therefrom and is set in the primary memory, i.e. a time of day location within the RAM 70. As shown in FIG. 3, an overflow output Q19 is derived from the counter 104 and is applied via an exclusive OR gate 106 to one input of an exclusive OR gate 107, whereas the other input of the exclusive OR gate 107 is derived from a delay circuit primarily comprised of resistor R52 and capacitor C51. Upon the initial application of the secondary voltage Vcc', the capacitor C51 is charged to a predetermined level until the exclusive OR gate 107 resets the counter 104 back to 0. Further, the output of the exclusive OR gate 106 is applied via the AND gate 108 and OR gate 110 to the CA2 input of the VIA 50 as shown in FIG. 2B. The other input to the AND gate 108 is the primary voltage Vcc, thus enabling the AND gate 108 only in the presence of the primary voltage Vcc. Further, as will be explained, a high frequency clock signal is applied from the PA3 output of the VIA 50 via the exclusive OR gate 103 to the IN input of the counter 104. The output of the divider 102 is also applied via an exclusive OR gate 112, an AND gate 114 and an OR gate 116 to the input CA1 of the VIA 50.

Upon failure of the primary power source, the primary voltage Vcc is removed from selected of the circuit elements of the time of day circuit 80 as shown in FIG. 3, and in particular, from the inputs of the AND gates 108 and 114, thus disabling the AND gates 108 and 114. As result, the current drain imposed upon the secondary power source and in particular the battery B1 as shown in FIG. 6 is reduced, i.e. the load as would be imposed by the via 50 is switched out of circuit with the battery B1 by disabling the AND gates 108 and 114, which act as switch means. In addition, the clock output of the divider 102, is also blocked by the disabled AND gate 114. Upon the restoration of the primary power source, the primary voltage Vcc is reapplied to enable the AND gates 114 and 108. As a result, the clock output of the divider 102 is permitted to pass via the enabled AND gate 114 to the CA1 input of the VIA 50, whereby the count accumulated in the secondary memory taking the form of the counter 104 is transferred via an enabled AND gate 108, the NOR gate 110, the input CA2 of the VIA 50 to be stored within the primary memory, i.e. the RAM 70.

Figure 4A:
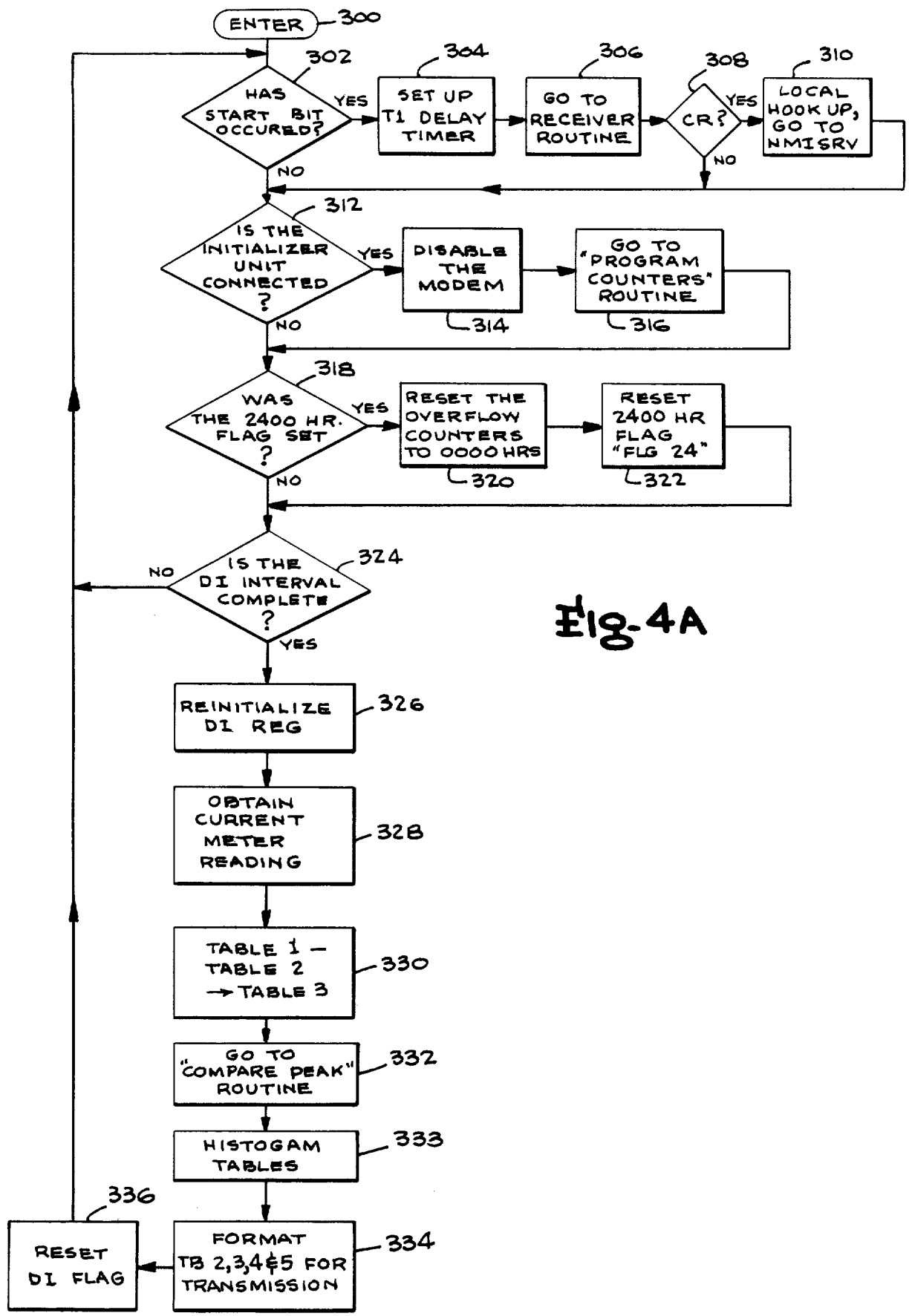
FIGS. 4A and 4B are respectively flow diagrams of a monitoring routine that is executed by the microprocessor system of FIGS. 1, 2A and 2B, to collect and process data, and of a sub-routine of the routine shown in FIG. 4A for receiving an interrogation call from the centrally disposed station and for formatting and transmitting data in return.

FIG. 4A shows a high-level flow diagram of a monitor routine that is executed by the microprocessor system 20 to collect and process meter data. Briefly, after entry in step 300, step 302 determines whether an interrogation call is received from a local hookup and in particular looks to see if a start bit as would appear at the PB7 input of the VIA 50 as shown in FIG. 2B, is provided. Step 312 determines whether the counter preset unit or initializer 34 is connected. If yes, step 314 disables the answer modem 18, and routine 316 is run to enter the initializing count in the selected counter 24. If no, step 318 determines if the time of day equals 2400 HRS, indicated by the 2400 HR flag being set. Steps 320 and 322 respectively resets the time indication in counter 104 to "0000 HRS" and resets the 2400 HR test flag to "0". Step 324 checks to determine whether a given demand interval (DI) has timed out and if not, the monitor routines loops back to step 302. If yes, step 326 provides for a reprogramming or reinitializing of the demand interval. Step 328 is a part of the process whereby the counts, which are stored within the counters 24 are read to calculate the counts received within a given interval. In particular, a series of tables, 1, 2 and 3 are established within the RAM 70, the first table indicative of the current data accumulating, Table 2 indicative of the previous data accumulating and Table 3 being the difference or that measured quantity, e.g. flow, that has occurred in the most recent time interval. Step 330 calculates the difference between the counts of tables 1 and 2 to provide a value of the counts received in a given interval as placed in Table 3. Step 332 is used to determine a maximum peak interval, wherein a fourth, maximum count table is used for receiving and comparing the current interval count as stored in Table 3 with the peak count stored in Table 4. If the count stored in Table 3 is greater than that in Table 4, Table 4 is updated with the new peak count. Next in step 333, a fifth table is set up comprising an array of storage locations for receiving the meter or data readings from table 3 for each of the previous time intervals. More specifically, as utility consumed during the last interval is stored in table 3, that data is also transferred to the next location of the fifth table. The number of locations of the table 5 is only limited by the size of the RAM 70. Thus, after an extended period of time, a sequence of data or meter readings for each interval is stored in the array of table 5. For example, meter readings could be taken each hour and the difference therebetween stored in an array of 24 storage locations within the RAM 70, whereby an indication of the utility use for a complete day may be provided. Step 334 formats the data as stored in Tables 2, 3, 4 and 5 for transmission via the answer modem 18 and the data coupler 14 to the master station 12.

Figure 4B:
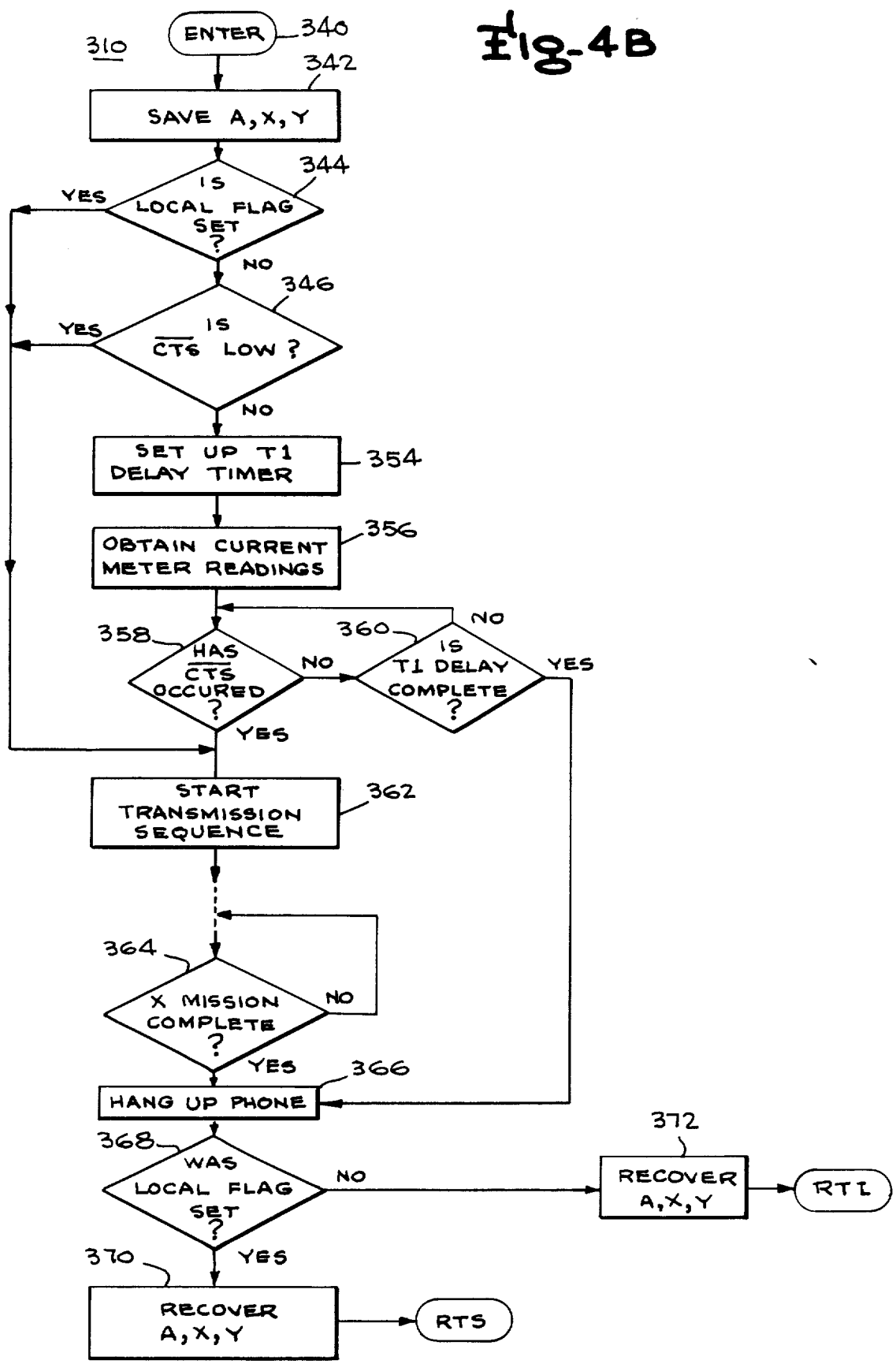

The answer mode control routine (NMISRV) is initiated by the receipt of a non-maskable interrupt signal as derived from the answer modem 18 upon the receipt of an interrogation call from the master station 12. Alternately as shown, generally in FIG. 4A, and more specifically in FIG. 4B, the routine NMISRV may be entered as in the local hookup step 310 of the monitor routine. Initially in step 342, the status and working registers of the microprocessor are saved in a stack formed in the RAM 70. Next, step 344 determines whether the local flag is set indicating that the data accumulating system 16 is directly coupled to a data terminal or alternatively, whether the data accumulating system 16 is coupled via the data coupler 14 to telephone lines 13. If connected to the telephone lines 13, step 346 then determines whether the CTS signal has gone low as would be derived from the modem 18 and applied to the VIA 50, indicating that a handshaking relationship has been established between the modem 18 of the data accumulating system 16 and the master station 12. On the other hand, if an interrogation call is transmitted from the master station 12 and a handshaking relationship has not been established therebetween, i.e. step 346 decides no, the timing of a period T1 of twelve seconds is initiated in step 354. Next, in step 356, the counters 24 are accessed to determine the current meter readings. Thereafter, step 358 again determines whether the CTS signal has gone low and if not, step 360 determines whether the T1 delay period has timed out. If not, the routine will loop between steps 358 and 360 until either the CTS signal goes low or the time delay period expires, at which time the routine exits through step 366 to "hang up" the phone and to effect a return from interrupt (RTI) to the MONITR routine of FIG. 4A. The time delay T1 will time out, if there was an illegal call and the calling station could not provide the required handshaking signals, or the transmission lines were defective. If either of steps 346 or 358 determines that the CTS signal has gone low, there is an indication, that the modem 18 and its data accumulating system 16 is ready to transmit data and that the master station 12 is ready to receive the transmitted data.

When the CTS signal has gone low, step 362 starts the transmission sequence wherein each bit of the data message as formulated in step 334 is transferred at a rate of 300 bits per second to the modem 18. In the transmission process, a variable table is formed in the RAM 70 to permit the forming of a heading, the framing of the requested data and appropriate carriage returns whereby the printout devices provided at the master station 12 may be operated in a manner to present data in a desired display format. Step 364 determines whether transmission has been completed and if no, returns to an intermediate step of the transmission process. If yes, step 366 shuts down the answer modem 18 and in effect hangs up the phone. Next, step 368 determines whether the local flag was set and if not, step 372 recovers the data and return addresses stored in the RAM stack before returning to look for new interrupts. If the local flag was set, the return addresses and input message as stored in the RAM stack are recovered and a return to subroutine (RTS) is effected in step 370. The significance of the local call is that the data accumulating systems 16 is connected to a local terminal for on-site interrogation.

The program as shown in FIGS. 5A and 5B is stored within the PROM 60 to be executed by the processor 40 as shown in FIGS. 2A and 2B. As briefly explained above, FIG. 3 shows the TOD clock circuit 80, whose elements are energized in the case of power outages by the auxiliary power supply which continues to supply a voltage Vcc' to the elements of circuit 80 even in the absence of Vcc. The crystal 100 provides a clock signal to be divided by divider 102 before being applied to the counter 104, particularly noting that the counter 104 is energized by the voltage Vcc'. The overflow terminal Q19 of the counter 104 is applied via NOR gate 110 to the CA2 input of the VIA 50 as shown in FIG. 2B. Referring to FIG. 5A, upon initialization or the restoration of primary power source to the data accumulating system 16, the power-on reset and watchdog timing circuit 74 drives low the $\overline{\text{RES}}$ input of the CPU 40, thereby resetting the CPU 40 and calling an initialization routine. As a part of the initialization routine, a call is made to the program as shown in FIGS. 5A and 5B and this program is entered in step 400. Step 402 sets into a RAM location a maximum number of counts corresponding to 36 hours, 24 minutes and 32 seconds, which is the maximum storage time of the counter 104. Next in step 404, a software routine is run to generate and apply a very high frequency clock signal from the PA3 output of the VIA 50 through the NOR gate 103 to the counter 104 to increment the count therein corresponding to the correct time of day, until counter 104 overflows to provide from its output Q19 a signal or flag via the NOR gates 106 and 110, and the enabled AND gate 108 to the CA2 input of VIA 50, thereby terminating the generation by the software of the high frequency clock signal. Step 406 checks to see whether the CA2 interrupt signal has occurred and if not, step 407 decrements by one second the maximum count of 36 hours, 24 minutes and 32 seconds as stored in the time register of RAM 70. The maximum amount of time stored in RAM 70 will be decremented until the interrupt at CA2 occurs, whereby in effect the correct time as stored in the counter 104 has been transferred from the counter 104 of the time of day circuit 80 to the time register in RAM 70. A further check is made after the interrupt has occurred in steps 408 and 410 to determine whether the time register within RAM 70 is greater than 24 hours and if yes, to subtract 24 hours from that value. Thus at step 412, the time indication in the time register of RAM 70 is the correct time of day. Thereafter, it is then necessary to transfer the correct value as stored in the time register to the counter 104 of FIG. 3 as by steps 418 to 426. These steps 418 to 426 effect a time or count transfer in a similar manner to steps 404, 406 and 407, since counter 104 is automatically reset to "0000" (zero) when the overflow interrupt occurs.

FIG. 6 is a detailed circuit diagram of the battery backup supply 38, as shown generally in FIG. 1, for continuing to apply the secondary voltage Vcc' to the counters 24, as well as to the time of day circuit 80 shown in FIG. 3, even after primary power failure. The regulated supply 36 is connected to conventional AC power line to supply a primary voltage Vcc to the input of the battery backup supply 38 across resistors R35 and R36, whereby a transistor Q3 is biased conductive, thus in turn biasing transistor Q2 conductive. Thus, in the presence of the primary voltage Vcc, a diode D2 is backbiased thus preventing the secondary power source in the form of battery B1 from applying its voltage to the counters 24 and to the time of day circuit 80. While the voltage Vcc is applied, the battery is being charged through tickle resistor R39. While the primary voltage is present, the transistor Q2 is conductive and applies a voltage Vcc' slightly less the primary voltage Vcc to the TOD circuit 80.

As further shown in FIG. 6, the output of the battery or auxiliary power source B1 is also applied to a first operational amplifier 122, which compares Vcc' with the primary voltage Vcc and if less than or more negative than a predetermined value generates a warning signal in the form of the BATFLG flag that is applied to the VIA 50 as shown in FIG. 2B. In similar fashion, the secondary voltage Vcc' is applied to a second operational amplifier 120 which compares the secondary voltage Vcc' to the primary voltage Vcc and if greater or more positive by a predetermined value also sets the BATFLG flag; in this fashion, the microprocessor system 20 may provide a manifestation to the operator of the master station 12 indicative of the failure of the secondary power source, i.e., the battery B1.

FIG. 7 is a flow diagram of a routine as stored in the PROM 60 as shown above in FIG. 2B for effecting to scan of the outputs of the meters 30 to determine whether they are coupled to the counter data bus 21 as shown in FIGS. 2A and 2B. The meter scanning routine determines how many meters 30 are connected to the counter data bus 21 and to store that information in RAM 70, whereby upon receiving an interrogation message from the master station 12, the microprocessor system 20 access only those counters 24 associated with meters 30 that are actually coupled to the data accumulating system 16, ignoring those meter inputs to the data accumulating system 16 that are unconnected to any meter 30. In this regard it is noted, that the bus coupled to the counters 24 includes the counter select bus 23, the counter digit select bus 25 and the counter data bus 21; such buses are configured to receive up to the given number "n" of meters 24. In accordance with this invention a selected number of meter 30 equal to or less than "n" may be coupled to the data accumulating system 16.

After entering the meter scanning routine through step 700, step 702 sets a TEMP register within the RAM 70 to zero. The TEMP register stores a count indicative of the number of meters 30 that are connected to the counter bus 27. In addition, step 702 sets an index register X to a predetermined value, e.g. 10; the index register is a location within the RAM 70 wherein the index to the starting address of the counters 24 to be addressed via counter select bus 23, is stored. Next in step 704, the counter 24 whose base address is indexed by register X is addressed. In the initial instance, the counter 24 having the base address indexed by 10, is addressed first and it is determined whether its output as appears on the counter data bus 21 equals "F," which is an illegal digit "1111," as by step 706. If no, step 708 determines that a counter 24 is connected to the counter bus 27, and thereafter in step 710, the TEMP register is incremented, whereas the index register X is decremented in step 712. Step 714 determines whether the counter address as stored in the index register X is 0 and if not, recycles to step 704, whereby the process is repeated until the counter address as stored in the index register X is decremented to 0. When the address within the index registered X has been decremented to 0, the first of the two scans has been completed and the program continues on to step 716, to test whether the contents of the TEMP register equals to 0 and if so as decided by step 718, a "no counters" flag is set in step 720. Otherwise, in step 722, the second scan begins by setting the index register X to 0 and an index register Y to 0. As will become apparent, the index register Y is a location in RAM 70 where the number of meters 30 as coupled to the counter bus 27 is stored noting that the TEMP register as referred to above is a temporary register that is incremented during the first scan to that number of meters 30 as detected during the first scan and is incremented during the first scan to a number indicative of the number of connected meters 30, whereas in the second scan, the TEMP register is decremented until its value equals 0. In step 724, the count as currently stored in the index register X is addressed via the counter select bus 25 and its output is compared with the invalid digit "F" and if unequal, a notation is made in step 730 that its contents are valid and a meter 30 is coupled to the bus 27. In step 732, the TEMP register is decremented and in step 734, the contents of the TEMP register is compared to 0, and if not equal to 0, the second scan is continued in step 728, which increments by one each of the index registers X and Y, before returning to step 724, thus steps 722 to 734 are repeated until the TEMP register has been decremented to 0 indicating the completion of the second scan. As seen above, the index register Y has been incremented a number of times corresponding to the number of meters 30 coupled to the counter bus 27. Thus, in step 736, a manifestation is provided indicative that the value as stored in the index register Y is equal to the total number of meters 30 connected to the counter bus 27, which number is transferred in step 738 to the location CHNCTR within the RAM 70. In this manner, the microprocessor system 20 may respond to an interrogation signal to access only those counters 24 actually coupled to meters 30 and to transmit back a message of a reduced length whose data is indicative of only the coupled meters 30.

Figure 8:
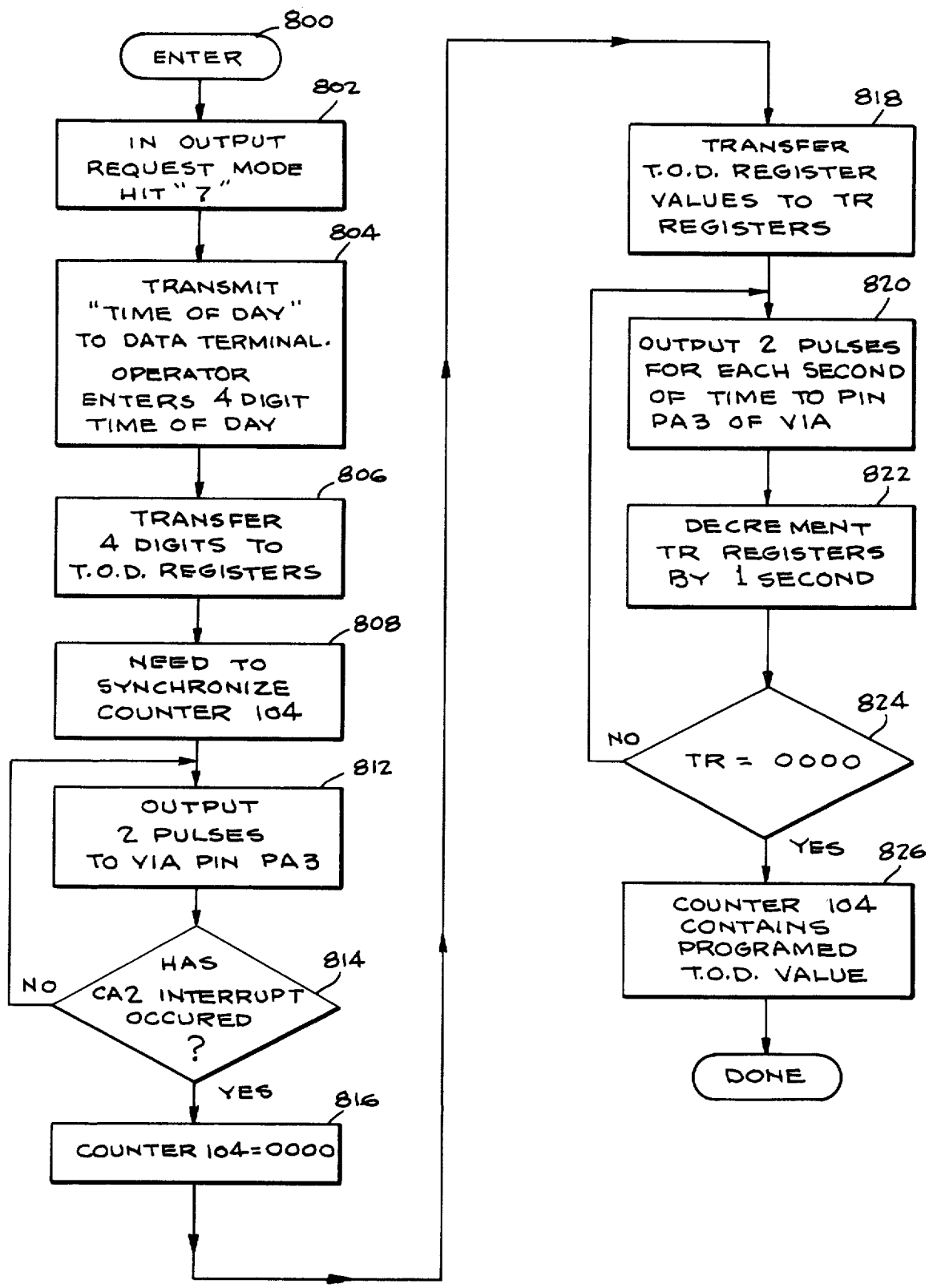
FIG. 8 is a high level flow diagram of a routine for initializing the time of day circuit shown in FIG. 3 and in a particular, for transferring the time of day manifestation as stored in the RAM shown in FIG. 2B into a counter of the time of day circuit.

The routine shown in FIG. 8 permits the time of day circuit 80 as shown in FIG. 3 to be initialized and in particular to transfer the counted manifestation of the correct time of day as entered in the RAM 70 to be transferred therefrom to the counter 104 of the time of day circuit 80. After entering via step 800, step 802 senses the presence of a command "7" that has been previously transmitted from the master station 12 to the data accumulating system 16. Beforehand, the operator at the master station 12 has sensed that the present manifestation of the time of day is incorrect and that a correction needs to be made. Step 804 waits for the operator to enter the corrected time of day via the terminal at the master station 12. Upon receipt, step 806 transfers the four digits indicative of the correct time of day into a corresponding register of the RAM 70. Next step 808 initiates the sychronization and in particular the transfer of the correct time of day as transmitted from the master station 12 to the counter 104. In particular, step 812 outputs two pulses via the terminal PA3 of the VIA 50 to increment the present count as stored in the counter 104 until it has overflowed as sensed by step 814. When the counter 104 reaches its limit, an overflow signal is developed at the output terminal Q19 and applied to the interrupt input CA2 of the VIA 50. When this has occurred, step 816 indicates that the counter 104 has been reset storing digits "0000" therein. As indicated in FIG. 8, steps 812 and 814 cycle at a high rate to generate a series of pulses to the counter 104 until it has been reset. Thereafter in step 818, the value of the correct time of day manifestation as originally stored in a TOD register in RAM is transferred to a temporary register TR, also in the RAM 70. Step 820 thereafter causes two pulses, i.e. one second, of the time of day indication to be applied via the output terminal PA3 of the VIA 50 to the counter 104 and at the same time to decrement by step 822 the time of day manifestation as stored in the temporary registers TR. Step 824 determines whether the time of day manifestation as entered in the temporary register TR has been reduced to 0 and if not, cycles back through steps 820 and 822 until the correct value of the time of day as stored in the temporary register TR has been reduced to 0. At this time, it would be understood as indicated in step 826 that the correct value of the time of day has been entered into the counter 104.

Referring now to FIG. 9, the interrupt request polling routine is entered when any of the interrupt conditions is present; in such case, the interrupt enable register within the VIA 50 has been set and the IRQ "output" of the VIA 50 is forced low. When the IRQ "input" of the processor 40 is set low, the address of the interrupt request polling routine is pulled from the RROM 60 to enter the interrupt request polling routine 900. The routine 900 is entered in step 902 which saves the current address appearing in the program counter and places it in a stack formed in the RAM 70. Step 904 saves the values as currently appearing in the accumulator or main operating register of the processor 40, as well as the values appearing in the X and Y index registers thereof, into the same stack of RAM 70, whereby upon completion of the routine 900, a return may be effected to the interrupted routine. Next in step 906, the routine accesses an interrupt status register IFRREG within the VIA 50, that contains the status of the various interrupt conditions, as well as the interrupt enable register IERREG and loads the contents of these registers into the accumulator, whereby an anding operation is effected on the contents of these two registers. Thereafter, the contents of the interrupt status register is restored in the IFRREG register of the VIA 50, whereby the interrupts that have occurred are forced to 0 to prepare this register to receive and to examine the next interrupt condition. Next in step 908, the routine 900 examines the accumulator register, wherein the previous contents of the IFRREG register has been stored, to determine whether an alarm has occurred. If yes, step 910 pushes (or saves) the contents of the accumulator into the aforementioned RAM stack, whereby the current interrupt condition is stored, thus enabling the detection of simultaneouly occurring interrupt conditions. Next, step 912 sets the appropriate alarm flags AL1 FLG or AL2 FLG before step 914 pulls (or restores) the last value from stack indicating the interrupt conditions back into the accumulator. Next step 916 determines whether the time of day (T.O.D.) interrupt has occurred and if yes, step 918 pushes (or saves) the contents of the IFRREG register into the RAM stack, before step 920 increments the time of day register in RAM and step 922 increments the demand interval (DI) timer counter formed in RAM 70. Thereafter, step 926 pulls the last value from the RAM stack and places it in the accumultor. Then, step 928 determines whether the timer T1 as found in the VIA 50 has timed out; if yes, step 930 pushes the value as found in the accumulator into the RAM stack, before step 932 resets the power-on reset and watchdog timer 74 as shown in FIG. 2A. Each time the T1 interrupt occurs (approximately every 50 ms), the TMRRST signal is applied to transistor Q1 of the timer 74. If T1 interrupt is not generated as would occur if the CPU 40 stopped running or got lost in a part of the program execution, possibly due to a transient condition occurring, then capacitor C21 charges through resistors R3 and R4, in approximately two seconds to a voltage sufficient to trigger a system reset of the CPU 40. Next step 934 increments another timer, i.e., the delay timer T1, which times out in various programs to provide a delay of a given time period, before step 936 pulls the last value from the stack to be placed in the accumulator. Next step 938 determines whether counter 104 has overflowed to place a signal upon the CA2 input of the VIA 50 and if yes, step 940 sets the CA2 FLG flag. Thereafter, step 942 pulls the values of A, X and Y from the RAM stack and places them into the accumulator, and X and Y index registers of the processor, before step 944 pulls the next value from the RAM stack indicative of the interrupted program counter and returns that value to the program counter.

It should be understood that the foregoing description relates to a preferred embodiment of the invention and that modifications may be made therein without departing from the teachings of this invention as set forth in the appended claims.

I claim:

1. A timing system for maintaining an accurate manifestation of time in the event of the failure of a primary power source, said timing system comprising:
   (a) clock means energizable for generating a train of clock pulses;
   (b) a secondary power source;
   (c) means responsive to the failure of the primary source for applying said secondary power source to energize said clock means to produce said train of clock pulses;

(d) primary memory means for receiving and accumulating said train of clock pulses to provide a first manifestation of time;

(e) secondary memory means energizable by said secondary power source for receiving and accumulating said train of clock pulses as an accumulated count providing a second manifestation of time; and (f) transfer means responsive to the restoration of the primary power source for transferring said second time manifestation as stored in said secondary memory means to said primary memory means, whereby said second time manifestation is indicative of the time that the primary power source is restored.

2. The timing system as claimed in claim 1, wherein said transfer means comprises means for generating and applying a second train of clock pulses to said secondary memory means to effect a transfer of said accumulated count stored therein to said primary memory means.

3. The timing system as claimed in claim 2 wherein said transfer means further comprises means responsive to the restoration of the primary power source for entering a predetermined count in said primary memory means.

4. The timing system as claimed in claim 3, wherein said secondary memory means has a capacity equal to said predetermined count and is coupled to said generating means, said secondary memory means responsive to the counting of said second train of clock pulses to said predetermined count, for providing an overflow signal to said generating means for terminating the generation of said second train of clock pulses.

5. The timing system as claimed in claim 4, wherein said transfer means comprises means responsive to the pulses of said second train for decrementing said predetermined count entered in said primary memory means, whereby upon the termination of the generation of said second train of pulses, a correct manifestation of time is entered into said primary memory means.

6. A data accumulating system normally energized by a primary source of power for accumulating data with respect to the time of day, said data accumulating system comprising:

(a) data means for generating a number of data signals proportional to the data to be accumulated;

(b) clock means energized by the primary power source for providing a first manifestation indicative of the time of day;

(c) first memory means responsive to said first manifestation for selectively receiving and accumulating the data signals for a specified interval of time initiated and terminated respectively at first and second times of day as indicated by said first manifestation;

(d) a secondary source of power;

(e) means responsive to the failure of the primary power source for applying said secondary source of power to said clock means to provide a second manifestation indicative of the time of day and to the restoration of the primary power source to reset said clock means to the correct time of day dependent upon said second manifestation provided during the failure of the primary source of power.

7. The data accumulating system as claimed in claim 6, wherein said clock means generates a train of pulses and there is further included;

second memory means energized by the primary power source for receiving and accumulating said train of pulses as a first accumulated count providing said first manifestation of time.

8. The data accumulating system as claimed in claim 7, wherein there is further included:

third memory means energizable by said secondary power source for receiving and accumulating said train of pulses as a second accumulated count providing said second manifestation of time, said primary power failure responsive means responsive to the failure of the primary power source for applying said secondary power source to said third memory means.

9. The data accumulating system as claimed in claim 8, wherein there is further included:

transfer means responsive to the restoration of said primary power source for transferring said second manifestation of time as stored in said third memory means to said second memory means.

10. The data accumulating system as claimed in claim 9, wherein said transfer means comprises means for generating and applying a second train of pulses to said third memory means to effect a transfer of said accumulated count stored therein to said second memory means.

11. The data accumulating system as claimed in claim 10, wherein said transfer means further comprises means responsive to the restoration of said primary power source for entering a predetermined count in said second memory means.

12. The data accumulating system as claimed in claim 11, wherein said third memory means has a capacity equal to said predetermined count and is coupled to said generating means, said third memory means responsive to the counting of said second train of pulses to said predetermined count, for providing an overflow signal to said generating means for terminating the generation of said second train of pulses.

13. The data accumulating system as claimed in claim 12, wherein said transfer means comprises means responsive to said second train of pulses for decrementing said predetermined count entered in said second memory means, whereby upon the termination of the generation of said second train of pulses, a correct manifestation of time is entered into said second memory means.

14. A remote data accumulating system to be interrogated by a message transmitted from a central station, said remote data accumulating system comprising:

(a) means for connecting a variable, selected number of data sources to said remote data accumulating system, said selected number being limited to a maximum number of data sources, said data sources providing respectively data signals indicative of the data measured by the data sources;

(b) a number of counter means equal to said maximum number, for receiving and accumulating respectively data signals from said data sources coupled by said connecting means to said remote data accumulating system;

(c) means coupled to said connecting means for scanning said data sources coupled by said connecting means to said remote data accumulating system, for determining said variable, selected number of said data sources;

(d) selecting means remotely initiated by the transmitted message for accessing said counter means corresponding to said coupled data sources in accordance with said selected number, to determine the accumulated data signals in said selected number of counter means; and (e) means for transmitting a return message from said remote data accumulating system to the central station indicative of the accumulated data signals by said selected number of said coupled data sources.

15. The remote data accumulating system as claimed in claim 14, where there is further included:
clock means energizable by a primary source of power for providing a first manifestation of the time of day.

16. The remote data accumulating system as claimed in claim 15, wherein there is included:
a secondary source of power; and
means responsive to the failure of the primary source of power for applying said secondary source of power to energize said clock means to provide a second manifestation of the time of day and responsive to the restoration of the primary source of power for transferring said second manifestation to reset said clock means with an accurate time of day.

17. The remote data accumulating system as claimed in claim 16, wherein there is included means coupled to said secondary source of power for determining the level thereof and if below a predetermined level for providing a manifestation indicative thereof, said transmitting means responsive to said low level manifestation for transmitting a return message indicative thereof from said remote data accumulating system to the central station.

18. The remote data accumulating system as claimed in claim 14, wherein there is included alarm means responsive to an alarm condition occurring at said remote data accumulating system for providing an alarm manifestation, and said transmitting means responsive to said alarm manifestation for transmitting said return message indicative thereof.

19. The remote data accumulating system as claimed in claim 14, wherein there is included:
means coupled to each of said counter means for presetting said counter means with initial values of the data to be provided by said data sources coupled by said connecting means to said remote data accumulating system.

20. The remote data accumulating system as claimed in claim 19, wherein there is further included:
means for coupling said presetting means selectively to each of said counter means, whereby the initial value of the data to be measured by a corresponding source is entered into its corresponding data counter means.

21. The remote data accumulating system as claimed in claim 18, wherein there is included memory means comprising first, second and third locations dedicated to at least one of said counter means, and there is further included means responsive to said first manifestation for storing the accumulation of data signals from said counter means at a first instant in time in said first memory location, for storing the accumulation of data signals at a second instant of time in said second memory location, and for determining a difference between said accumulations stored in said first and second memory locations, said difference to be stored in said third memory location to provide a second manifestation indicative of the data signals accumulated within the said interval of time between said first and second instances in time.

22. The remote data accumulating system as claimed in claim 21, wherein there is included means for receiving the transmitted message from the central station to provide a third manifestation indicative of a selected interval of time between the first and second instants of time, and said memory means being responsive to said third manifestations for controlling the timing of accessing and the storing of data in said first and second memory locations so that the interval between said first and second instances of time is set in accordance with said third manifestation.

23. The remote data accumulating system as claimed in claim 21, wherein said memory means comprises a fourth memory location for storing a third manifestation indicative of the peak data accumulated by at least one of said data sources, and means for comparing said second manifestation in said third memory location with said third manifestation stored in said fourth memory location and, if greater, for updating said fourth memory location with said second manifestation.

24. A data accumulating system remote from a central station for determining data accumulated during a variable, selected interval of time dependent upon the time of day, said remote data accumulating system comprising:

(a) at least one data source for measuring data and for providing a number of signals proportional to the measured data;

(b) clock means for generating a continuous time of day manifestation;

(c) memory means comprising first, second and third memory locations;

(d) counter means coupled to said data source for receiving and accumulating the data signals for providing a manifestation of the measured data;

(e) means responsive to an interrogation call transmitted from the central station indicative of a desired interval of time, for determining a storage interval manifestation; and (f) means responsive to said time of day manifestation and said storage interval manifestation for accessing said counter means at a first instant of time for storing a first manifestation indicative of the accumulated data at a first instant in time in said first memory location, for storing a second manifestation at a second instant in time indicative of the data accumulated in said counter means at said second instant of time in said second memory location, and for determining the difference between said first and second manifestations to provide a difference manifestation indicative of the measured data as accumulated within that interval of time between said first and second instances of time and for storing said difference manifestation in said third memory location, said second instant of time occurring after said first interval of time in accordance with said storage interval manifestation.

25. The remote data accumulating system as claimed in claim 24, wherein said clock means is energized by a primary source of power to provide a first manifestation of time, and there is further included secondary power means, and means responsive to the failure of said primary source of power for energizing said clock means with said secondary power means to provide second manifestation of time and responsive to the restoration of said primary source of power for resetting said primary clock means with said second manifestation provided by said clock means during the duration of the primary power failure.

26. The remote data accumulating system as claimed in claim 24, wherein said memory means comprises an array of memory locations, each location of said array being dedicated to storing data corresponding to data accumulated in said third memory location during a particular time interval, and means for accessing at the end of each time interval said third location and for sequentially transferring the data accumulated therein during the last time interval to the next memory location of said array, whereby said array of memory locations provides an indication of the data accumulated in a sequence of intervals over an extended period of time.

* * * * *